(12) United States Patent
Smith et al.

(10) Patent No.: US 8,834,824 B2
(45) Date of Patent: Sep. 16, 2014

(54) METHOD OF TREATING A GAS STREAM

(75) Inventors: James Robert Smith, Taunton (GB);
Peter Leslie Timms, Bristol (GB);
Andrew David Wright, legal representative, London (GB)

(73) Assignee: Edwards Limited, Crawley, West Sussex (GB)

( * ) Notice: Subject to any disclaimer, the term of this patent is extended or adjusted under 35 U.S.C. 154(b) by 859 days.

(21) Appl. No.: 11/992,906

(22) PCT Filed: Sep. 21, 2006

(86) PCT No.: PCT/GB2006/003483
§ 371 (c)(1),
(2), (4) Date: Jul. 16, 2009

(87) PCT Pub. No.: WO2007/042749
PCT Pub. Date: Apr. 19, 2007

(65) Prior Publication Data
US 2009/0297420 A1   Dec. 3, 2009

(30) Foreign Application Priority Data
Oct. 7, 2005  (GB) ................... 0520468.0

(51) Int. Cl.
*B01D 53/68* (2006.01)
(52) U.S. Cl.
CPC .................. *B01D 53/685* (2013.01)
USPC ............................ 423/241; 422/173; 422/177
(58) Field of Classification Search
USPC ....... 423/241, 240 S, 490, 489; 422/168, 173, 422/174, 177; 95/131; 96/108
See application file for complete search history.

(56) References Cited

U.S. PATENT DOCUMENTS

| 4,042,667 A | | 8/1977 | Ishiwata et al. |
| 6,022,489 A | * | 2/2000 | Izumikawa et al. ...... 252/182.32 |
| 6,468,490 B1 | * | 10/2002 | Shamouilian et al. ........ 423/241 |
| 6,960,552 B2 | * | 11/2005 | Otsuka et al. ................. 502/302 |
| 7,141,221 B2 | * | 11/2006 | Irie et al. ....................... 422/172 |
| 2004/0159235 A1 | | 8/2004 | Marganski et al. |

FOREIGN PATENT DOCUMENTS

| EP | 0 483 587 B1 | 5/1992 |
| EP | 1 566 210 A1 | 8/2005 |
| JP | 61101231 A | 5/1986 |

(Continued)

OTHER PUBLICATIONS

Yamamoto Hideki; Shibata Hayaji; WPI abstract No. 2005-205220; abstract of JP 2005052724 entitled "Method and Apparatus for Detoxifying Fluorine-Based Gas," Mar. 3, 2005.

(Continued)

*Primary Examiner* — Jill Warden
*Assistant Examiner* — Joye L Woodard
(74) *Attorney, Agent, or Firm* — Westman, Champlin & Koehler, P.A.

(57) ABSTRACT

A method is described for treating a gas stream comprising fluorine ($F_2$) gas. In a preferred embodiment, the method comprises adding water vapor to a gas stream and conveying the gas stream and water vapor to a reaction chamber containing a heated bed of material to react with $F_2$ to form an inorganic fluoride while inhibiting formation of $CF_4$ within the reaction chamber, and at least partially evacuating the reaction chamber so that the gas stream is conveyed to and from the reaction chamber at sub-atmospheric pressure.

14 Claims, 2 Drawing Sheets

(56) References Cited

FOREIGN PATENT DOCUMENTS

| | | |
|---|---|---|
| JP | 04149010 A | 5/1992 |
| JP | 61562 A | 1/1994 |
| JP | 1015349 A | 1/1998 |
| JP | 11267677 A | 10/1999 |
| JP | 2003010638 A | 1/2003 |
| JP | 2003181286 A | 7/2003 |
| JP | 2004181299 A | 7/2004 |
| JP | 2005052724 A | 3/2005 |
| JP | 2005538824 A | 12/2005 |
| TW | 523491 B | 3/2003 |
| TW | 361102 B | 4/2012 |
| WO | WO 01/89666 A1 | 11/2001 |

OTHER PUBLICATIONS

Aramaki Minoru; Kawaguchi Masayuki; Nakamura Tamio; WPI abstract No. 1986-167067; abstract of JP 611101231 entitled "Removal of Fluorine Gas," May 20, 1986. Central Glass Co. Ltd.

Otsuka Kenji; Takemasa Noboru; Kamiyama Shinobu; Patent Abstracts of Japan, abstract of JP 4149010 entitled "Method for Refining Noble Gas," May 22, 1992, Japan Pionics.

United Kingdom Search Report of Application No. GB 0520468.0; Date of mailing: Jan. 24, 2006; Claims searched 1-18; Date of search: Jan. 23, 2006.

PCT Notification of Transmittal of the International Search Report and the Written Opinion of the International Searching Authority, or the Declaration of.

International Application No. PCT/GB2006/003483; Date of mailing: Nov. 22, 2006.

PCT International Search Report of International Application No. PCT/GB2006/003483; Date of mailing of the International Search Report: Nov. 22, 2006.

PCT Written Opinion of the International Searching Authority of International Application No. PCT/GB2006/003483; Date of mailing Nov. 22, 2006.

Prosecution history from corresponding Japanese Application No. 2008-534064 including: Office Action dated Jun. 28, 2012; Office Action dated Aug. 26, 2013.

* cited by examiner

METHOD OF TREATING A GAS STREAM

FIELD OF THE INVENTION

The present invention relates to fluorine abatement, and to a method of, and apparatus for, treating a gas stream containing fluorine ($F_2$) gas.

BACKGROUND OF THE INVENTION

A primary step in the fabrication of semiconductor devices is the formation of a thin film on a semiconductor substrate by chemical reaction of vapour precursors. One known technique for depositing a thin film on a substrate is chemical vapour deposition (CVD). In this technique, gases are supplied to a process chamber housing the substrate and react to form a thin film over the surface of the substrate. However, deposition is not restricted to the surface of the substrate, and this can result, for example, in the clogging of gas nozzles and the clouding of chamber windows. In addition, particulates may be formed, which can fall on the substrate and cause a defect in the deposited thin film, or interfere with the mechanical operation of the deposition system. As a result of this, the inside surface of the process chamber is regularly cleaned to remove the unwanted deposition material from the chamber.

One method of cleaning the chamber is to supply molecular fluorine ($F_2$) to react with the unwanted deposition material. Fluorine is either supplied at a high purity (at least 99% fluorine), or supplied diluted with nitrogen in the ratio of 20% $F_2$ to 80% $N_2$. In the cleaning process, the residence time of the fluorine in the process chamber is relatively short, and so only a small proportion of the $F_2$ gas supplied to the chamber is consumed during the cleaning process. Consequently, the majority of the cleaning gases supplied to the chamber are exhausted from the chamber together with by-products from the cleaning process.

In order to remove fluorine from the gas stream exhaust from the process chamber before the gas stream is exhaust to the atmosphere, an abatement device such as a thermal processing unit or plasma abatement device is typically provided to convert the $F_2$ into water-soluble hydrogen fluoride. The gas stream is subsequently conveyed to a wet scrubber, wherein the HF is taken into aqueous solution. The aqueous HF is then conveyed from the scrubber to an acid drain, or more commonly to a fluoride treatment facility, where a compound such as calcium hydroxide is typically used to neutralise the aqueous HF and precipitate from the aqueous HF a "cake" or "sludge" containing $CaF_2$. Such fluoride treatment facilities tend to be expensive, and are often capacity limited. Furthermore, disposal of the $CaF_2$ cake also tends to be expensive.

SUMMARY OF THE INVENTION

In a first aspect, the present invention provides a method of treating a gas stream comprising fluorine ($F_2$) gas, the method comprising the steps of conveying the gas stream to a reaction chamber containing a heated bed of material selected to react with $F_2$ to form an inorganic fluoride, and at least partially evacuating the reaction chamber so that the gas stream is conveyed to and from the reaction chamber at a sub-atmospheric pressure.

In a second aspect, the present invention provides apparatus for treating a gas stream comprising fluorine ($F_2$) gas, the apparatus comprising a reaction chamber containing a bed of material selected to react with $F_2$ to form an inorganic fluoride, means for heating the bed of material to a temperature above 200° C., and means for at least partially evacuating the reaction chamber so that the gas stream is conveyed to and from the reaction chamber at a sub-atmospheric pressure.

Features described above in relation to the method aspect of the invention are equally applicable to the apparatus aspect, and vice versa.

BRIEF DESCRIPTION OF THE DRAWINGS

Preferred features of the present invention will now be described with reference to the accompanying drawing, in which.

DETAILED DESCRIPTION OF THE INVENTION

In a first aspect, the present invention provides a method of treating a gas stream comprising fluorine ($F_2$) gas, the method comprising the steps of conveying the gas stream to a reaction chamber containing a heated bed of material selected to react with $F_2$ to form an inorganic fluoride, and at least partially evacuating the reaction chamber so that the gas stream is conveyed to and from the reaction chamber at a sub-atmospheric pressure.

By providing a heated bed of material, preferably an oxide or a carbonate of calcium or magnesium, and most preferably calcium carbonate and passing the $F_2$-containing gas stream through the heated bed the $F_2$ reacts with the heated bed of material to form an inorganic fluoride, which is retained within the reaction chamber. For example, $F_2$ reacts with $CaCO_3$ to form $CaF_2$, which is retained within the reaction chamber. We have observed that, with this technique, abatement of $F_2$ to less than 3 ppm can be achieved. In addition, as the gas stream is conveyed to and from the reaction chamber at a sub-atmospheric pressure, any leaks within a conduit system used to convey the gas stream to and from the reaction chamber will result in the ingress of air into the conduit system, rather than the leakage of fluorine out from the conduit system and into the atmosphere.

Furthermore, in the aforementioned example in which the heated bed of material comprises a calcium salt, due to the high purity of the $CaF_2$ formed within the reaction chamber the $CaF_2$ can be readily recovered for use, for example as a filler material.

The fluorine is reacted with said heated bed of material in the presence of an oxidant. The presence of an oxidant may inhibit formation of $CF_4$, in particular when the heated bed of material comprises a carbonate. The oxidant is preferably a gaseous oxidant added to the gas stream upstream from the reaction chamber. An example of an oxidant is water vapour. The oxidant is preferably added to the gas stream at a rate of between 0.1 and 5 sccm per 100 sccm of $F_2$.

The bed of material is preferably heated to a temperature above 200° C., for example to a temperature in the range from 250 to 600° C.

The gas stream may be heated upstream of the reaction chamber, preferably to a temperature similar to that of the bed of material.

In a second aspect, the present invention provides apparatus for treating a gas stream comprising fluorine ($F_2$) gas, the apparatus comprising a reaction chamber containing a bed of material selected to react with $F_2$ to form an inorganic fluoride, means for heating the bed of material to a temperature above 200° C., and means for at least partially evacuating the reaction chamber so that the gas stream is conveyed to and from the reaction chamber at a sub-atmospheric pressure.

Figure 1:
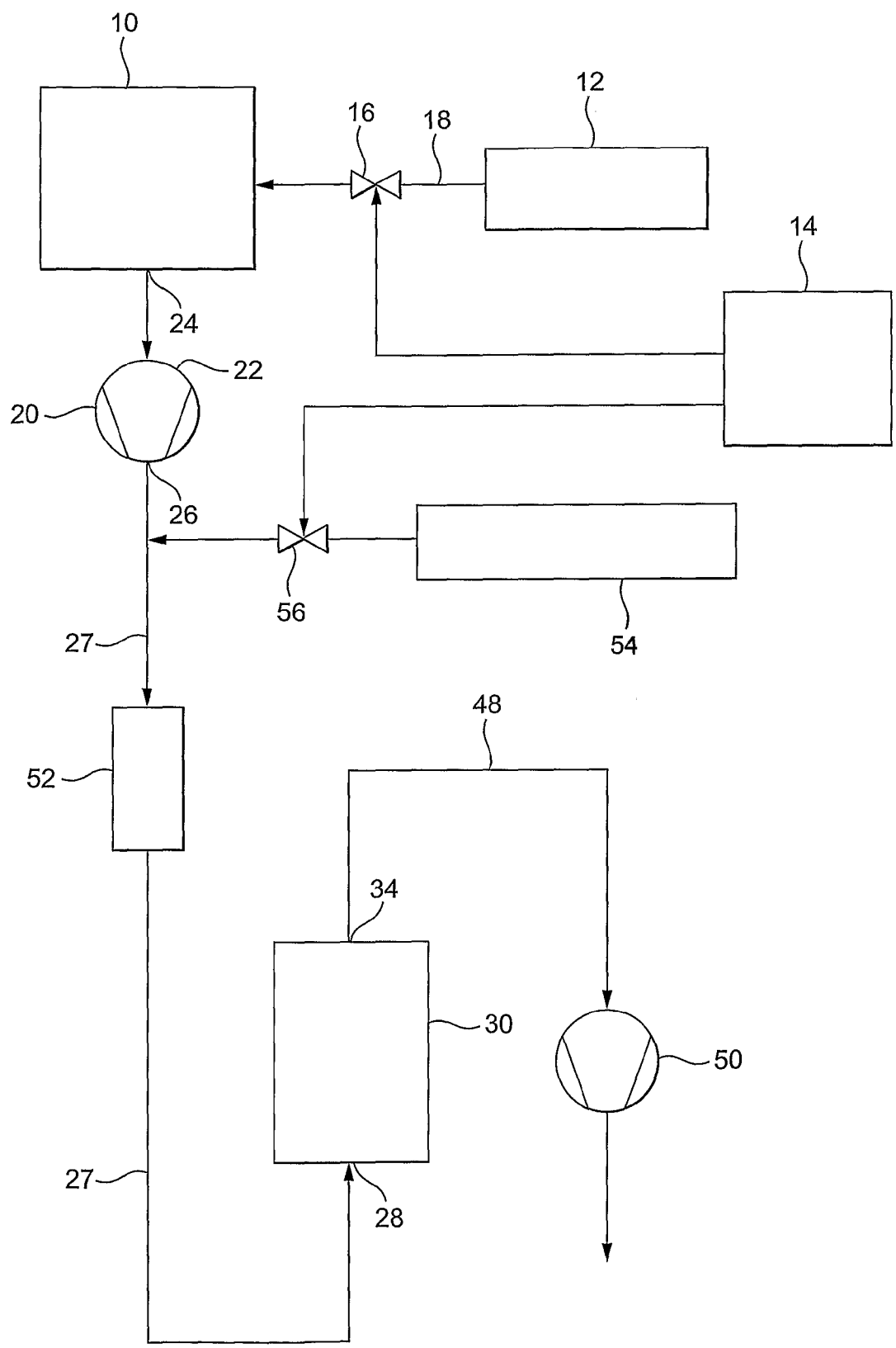
FIG. 1 illustrates schematically an example of apparatus for treating a gas stream containing $F_2$.

FIG. 1 illustrates schematically an apparatus for the treatment of a gas stream output from a process chamber 10. The process chamber 10 may be any one of a number of different types of chamber used to perform various processes in the semiconductor or flat panel industry, such as a chemical vapour deposition process. In order periodically clean the inside surface of the process chamber 10, for example to remove unwanted deposition material, fluorine gas ($F_2$) is periodically conveyed to the process chamber 10 from a source 12 thereof. As illustrated in FIG. 1, a controller 14 may control the supply of $F_2$ to the chamber 10 by selectively opening and closing a valve 16 located in a conduit 18 for conveying $F_2$ from the source 12 to the chamber 10.

A vacuum pump 20 has an inlet 22 connected to an outlet 24 from the process chamber 10 for drawing a waste gas stream from the process chamber 10. As the residence time of the fluorine in the process chamber 10 is typically only relatively short, only a small proportion of the $F_2$ gas supplied to the process chamber 10 tends to be consumed during the cleaning process. Consequently, the majority of the fluorine supplied to the process chamber 10 is exhausted from the process chamber 10 together with by-products from the cleaning process, and so it is necessary to treat the gas stream to remove the fluorine gas before the gas stream is exhausted into the atmosphere.

Figure 2:
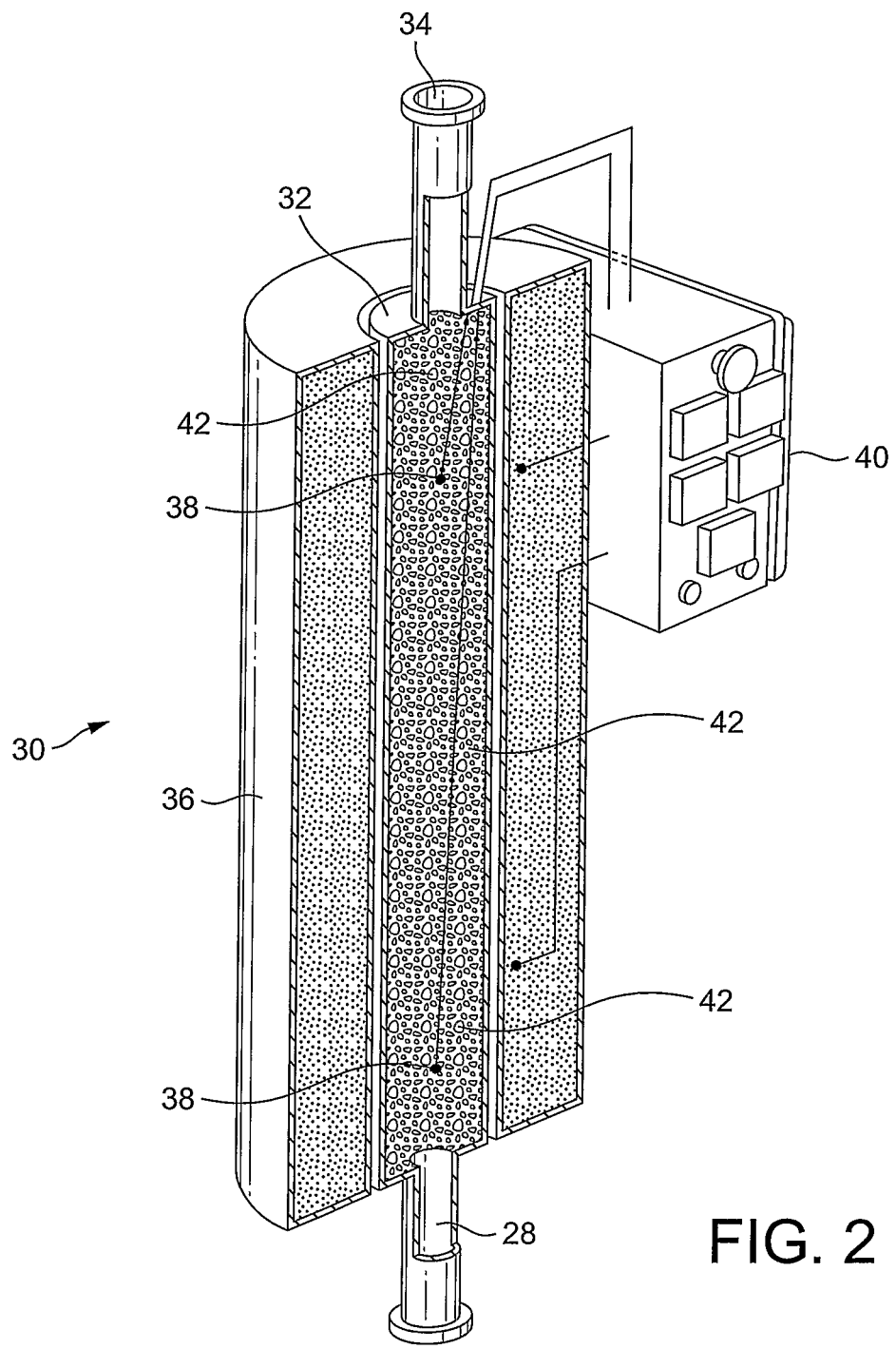
FIG. 2 illustrates one example of a reaction chamber containing a bed of material for reacting with the $F_2$ gas.

As illustrated in FIG. 1, the outlet 26 of the vacuum pump 20 is connected by a conduit system 27 to the inlet 28 of a reaction chamber 30. With reference to FIG. 2, the reaction chamber 30 may comprise a vertical cylinder or column 32, which is in the form of a removable cartridge having, at the inlet 28 located at lower end thereof and an outlet 34 at the upper end thereof. An electrically heated furnace 36 surrounds the column 32, spaced control thermocouples 38 being provided at different levels and connected to a temperature controller 40.

The column 24 contains a bed of material 42 selected to react with $F_2$ to form an inorganic fluoride. This material is preferably an oxide or a carbonate of calcium or magnesium. In this example, the material 42 comprises granular calcium carbonate, for instance a granular marble.

Returning to FIG. 1, the outlet of the 34 of the column 32 is connected by conduit system 48 to the inlet of a second pump 50, for example a liquid ring pump, fan or any other suitable form of pump for at least partially evacuating the column 32.

In use, the temperature controller 40 is operated to control the furnace 36 to heat the material 42 to a temperature in excess of 200° C., preferably between 250 ° C. and 400 ° C., for example 320 ° C. The gas stream exhausted from the pump outlet 26 is conveyed by the conduit system 27 at a sub-atmospheric pressure to the column 32. Consequently, any leaks in the conduit system 27 result in gas being drawn into the conduit system 27 from the ambient atmosphere, as opposed to leakage of the gas stream from the conduit system 27 into the ambient atmosphere. As illustrated in FIG. 1, a heater 52 may be located within or around part of the conduit system 27 for pre-heating the gas stream before it enters the column 32. Such a heater 52 is preferably controlled to heat the gas stream to a similar temperature as the furnace 36.

As the gas stream enters the column 32, any fluorine gas ($F_2$) within the gas stream reacts with the heated bed of calcium carbonate to form calcium fluoride ($CaF_2$), which is retained within the column 32. The gas stream is subsequently exhausted from the outlet of the column 32 and conveyed by the conduit system 48, again at a sub-atmospheric pressure, to the pump 50, which exhausts the gas stream at or around atmospheric pressure.

Exhaustion of the column 32 can be conveniently predicted by monitoring the amount of fluorine passed into the chamber 10, or by monitoring the composition of the gas stream exhausted from the chamber 10. This can enable the column 32 to be replaced at a convenient time, for instance, when the process tool is "off-line", after a predetermined amount of fluorine has entered the column, The materials in the replaced column can then be recycled as required.

In one example, a reaction chamber containing a bed of around 500 g of dry limestone ($CaCO_3$) was heated to a temperature of around 300° C., and a gas stream containing 20% $F_2$ and 80% $N_2$ was conveyed into the bed at various flow rates between 80 sccm and 160 sccm. Whilst the gas stream exhausted from the reaction chamber contained no fluorine, it was noticed that the exhausted gas stream contained some $CF_4$, in this example around 0.1% $CF_4$. This $CF_4$ may result from the reaction of $F_2$ gas with $CaCO_3$:

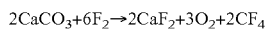

$$2CaCO_3 + 6F_2 \rightarrow 2CaF_2 + 3O_2 + 2CF_4$$

or as a result of the reaction of $F_2$ gas with carbon impurities contained within the bed of $CaCO_3$:

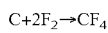

$$C + 2F_2 \rightarrow CF_4$$

Around 0.3% $CF_4$ has also been observed in the gas stream exhaust from the column 32 containing a bed of granular dolomite (a mixture of calcium carbonate and magnesium carbonate) heated to a temperature of around 320° C. when a gas stream containing 20% $F_2$ and 80% $N_2$ was conveyed into the bed at a flow rate of around 500 sccm.

Whilst this amount of $CF_4$ may be acceptable in some circumstances, clearly it is not desirable due to its effect as a greenhouse gas. Whilst an additional abatement device may be provided downstream from the reaction chamber for removing the $CF_4$ from the gas stream, depending on the flow rate of the gas stream the efficiency of such an abatement device may not be particularly high. Therefore, in order to inhibit the formation of $CF_4$ within the reaction chamber 30, as illustrated in FIG. 1 an oxidant, for example water vapour, may be conveyed, from a source 54 thereof, into the gas stream upstream from the reaction chamber 30, for example at a rate of 0.1 and 5 sccm per 100 sccm of $F_2$. In one example, 2 sccm of $H_2O$ was added to the gas stream per 100 sccm of $F_2$ within the gas stream, and it was observed that there was a substantial decrease in the amount of $CF_4$ contained within the gas stream exhausted from the reaction chamber. Alternatively, or additionally, the oxidant may be conveyed directly to the reaction chamber. As also illustrated in FIG. 1, the controller 14 may control a valve 56 located in a conduit 58 for conveying the oxidant from the source 54 to the conduit system 27 so that the oxidant is supplied to the gas stream synchronously with the supply of fluorine to the reaction chamber 30.

While the foregoing description and drawings represent the preferred embodiments of the present invention, it will be apparent to those skilled in the art that various changes and modifications may be made therein without departing from the true spirit and scope of the present invention.

We claim:

1. A method of treating a gas stream comprising fluorine ($F_2$) gas, the method comprising the steps of:
   adding water vapor to the gas stream prior to a reaction chamber;
   conveying the gas stream with the water vapor to the reaction chamber containing a heated bed of material for reacting with $F_2$ to form a solid inorganic fluoride wherein the bed of material contains at least one of carbonate or a material having carbon impurities and the water vapor inhibits formation of $CF_4$ within the reaction chamber; and at least partially evacuating the reaction chamber so that the gas stream is conveyed to and from the reaction chamber at a sub-atmospheric pressure.

2. The method according to claim 1 wherein the material comprises an oxide or a carbonate of calcium or magnesium.

3. The method according to claim 1 wherein the material comprises calcium carbonate.

4. The method according to claim 1 wherein the water vapor is added to the gas stream at a rate of between 0.1 and 5 sccm per 100 sccm of $F_2$.

5. The method according to claim 1 comprising the step of heating the material to a temperature above 200° C.

6. The method according to claim 5 comprising the step of heating the material to a temperature in the range from 250 to 600° C.

7. The method according to claim 1 comprising the step of heating the gas stream upstream of the reaction chamber.

8. The method according to claim 7 comprising the step of heating the gas stream to a temperature similar to that of the bed of material.

9. The method according to claim 7 comprising the step of heating the gas stream to a temperature above 200° C.

10. Apparatus for treating a gas stream comprising fluorine ($F_2$) gas, the apparatus comprising:
    a reaction chamber having an inlet and an outlet and containing a bed limited to a carbonate of calcium and/or magnesium from the inlet to the outlet, the bed reacting with $F_2$ to form a solid inorganic fluoride;
    a furnace configured to heat the bed of material;
    a water vapor source for introducing water vapor into the gas stream before the gas stream enters the reaction chamber so that the formation of $CF_4$ is inhibited within the reaction chamber; and
    a vacuum pump for at least partially evacuating the reaction chamber so that the gas stream is conveyed to and from the reaction chamber at a sub-atmospheric pressure.

11. The apparatus according to claim 10 wherein the material comprises calcium carbonate.

12. The apparatus according to claim 10 comprising a heater for heating the gas stream upstream from the reaction chamber.

13. The apparatus according to claim 10 wherein the bed of material is housed within a removable cartridge.

14. The apparatus according to claim 10 wherein the furnace is configured to heat the bed of material to a temperature above 200° C.

* * * * *

UNITED STATES PATENT AND TRADEMARK OFFICE
CERTIFICATE OF CORRECTION

| | |
|---|---|
| PATENT NO. | : 8,834,824 B2 |
| APPLICATION NO. | : 11/992906 |
| DATED | : September 16, 2014 |
| INVENTOR(S) | : James Robert Smith et al. |

Page 1 of 1

It is certified that error appears in the above-identified patent and that said Letters Patent is hereby corrected as shown below:

Claims

Claim 1:

Column 5, line 2, please insert --a-- after "at least one of".

Signed and Sealed this
Twenty-seventh Day of October, 2015

Michelle K. Lee
*Director of the United States Patent and Trademark Office*